US010342379B2

(12) United States Patent
Zanetti

(10) Patent No.: US 10,342,379 B2
(45) Date of Patent: Jul. 9, 2019

(54) PIERCING DEVICE FOR A SINGLE-DOSE CAPSULE FOR POWDERED COFFEE AND THE LIKE

(75) Inventor: Martino Zanetti, Villorba (IT)

(73) Assignee: HAUSBRANDT TRIESTE 1892 SPA, Nervesa Della Battaglia (TV) (IT)

(*) Notice: Subject to any disclaimer, the term of this patent is extended or adjusted under 35 U.S.C. 154(b) by 54 days.

(21) Appl. No.: 14/233,822

(22) PCT Filed: Jul. 18, 2012

(86) PCT No.: PCT/IB2012/053659
§ 371 (c)(1),
(2), (4) Date: Jan. 20, 2014

(87) PCT Pub. No.: WO2013/011465
PCT Pub. Date: Jan. 24, 2013

(65) Prior Publication Data
US 2014/0150616 A1    Jun. 5, 2014

(30) Foreign Application Priority Data
Jul. 21, 2011    (IT) .............................. TV2011A0105

(51) Int. Cl.
*A47J 31/44*    (2006.01)
*A47J 31/40*    (2006.01)
(52) U.S. Cl.
CPC ............. *A47J 31/44* (2013.01); *A47J 31/407* (2013.01); *Y10T 83/2096* (2015.04)
(58) Field of Classification Search
CPC .... A47J 31/44; A47J 31/4492; A47J 31/3676; A47J 31/46; A47J 31/605; A47J 31/369; B65D 85/8043
(Continued)

(56) References Cited

U.S. PATENT DOCUMENTS

| 945,445 | A | * | 1/1910 | Carr | .......................... | B26F 1/32 |
| | | | | | | 30/358 |
| 1,053,418 | A | * | 2/1913 | Martin | ..................... | E01H 1/12 |
| | | | | | | 294/50.5 |

(Continued)

FOREIGN PATENT DOCUMENTS

WO    2004087529 A1    10/2004
WO    2011010338 A2    1/2011

OTHER PUBLICATIONS

PCT International Search Report dated Jan. 18, 2013 for PCT/IB2012/053659, from which the instant application is based, 4 pgs.

(Continued)

*Primary Examiner* — Ghassem Alie
*Assistant Examiner* — Nhat Chieu Q Do
(74) *Attorney, Agent, or Firm* — Fredrikson & Byron, P.A.

(57) ABSTRACT

A piercing device, suitable for piercing the upper film of a capsule containing a material suitable for being used for preparation of a beverage, including a first end, a central body, and a second end, the first end having an operating surface provided with a plurality of piercing spikes protruding from the operating surface, the device furthermore including disengagement members on the operating surface, for disengaging the capsule once the upper film of the capsule has been pierced, thereby preventing a capsule from remaining attached to the device for piercing.

17 Claims, 4 Drawing Sheets

(58) Field of Classification Search
USPC .............. 30/358–359, 366–368; 83/128–131; 294/61, 50.5
See application file for complete search history.

(56) References Cited

U.S. PATENT DOCUMENTS

| | | | | | |
|---|---|---|---|---|---|
| 1,078,770 | A | * | 11/1913 | Christenson | B25H 7/04 30/366 |
| 1,572,524 | A | * | 2/1926 | Flannery | D05C 13/00 112/80.03 |
| 2,379,140 | A | * | 6/1945 | Louis | B26B 3/00 30/130 |
| 2,917,960 | A | * | 12/1959 | Gargrave | B21D 28/34 451/28 |
| 3,053,203 | A | * | 9/1962 | Gaddini | A21C 11/106 30/130 |
| 5,423,330 | A | * | 6/1995 | Lee | A61B 10/0233 600/566 |
| 6,391,041 | B1 | * | 5/2002 | Edens | A61F 9/0133 606/166 |
| 2003/0079616 | A1 | * | 5/2003 | Barnard | A23N 7/08 99/537 |
| 2005/0129809 | A1 | * | 6/2005 | Cortese | A47J 31/3633 426/77 |
| 2006/0130665 | A1 | * | 6/2006 | Jarisch | A47J 31/3633 99/279 |
| 2006/0225575 | A1 | * | 10/2006 | Denisart | A47J 31/3695 99/275 |
| 2008/0006159 | A1 | | 1/2008 | Fischer | |
| 2010/0064899 | A1 | | 3/2010 | Aardenburg | |
| 2010/0229734 | A1 | * | 9/2010 | Blier | A47J 17/10 99/646 R |

OTHER PUBLICATIONS

Italian Pat. App. No. TV2003A000058, filed Apr. 2, 2003, titled, "Single-Dose Plastic Capsule for Powdered Coffee and The Like" with English equivalent Intl. PCT Publication No. WO2004087529 published Oct. 14, 2004, Applicant Hausbrandt Trieste 1892 SPA, 17 pages.

* cited by examiner

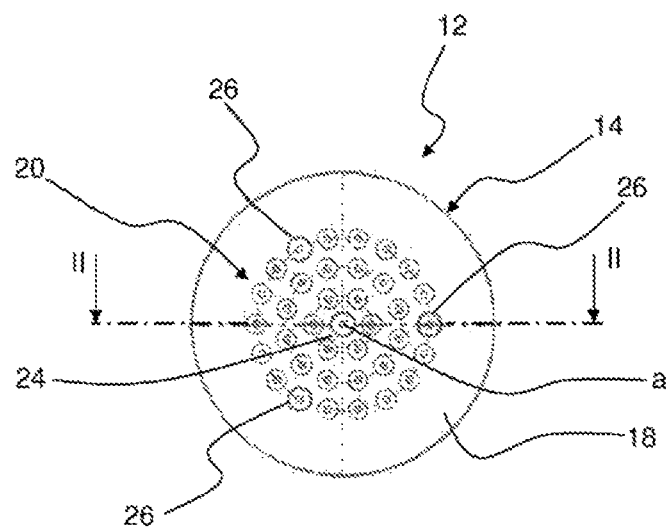
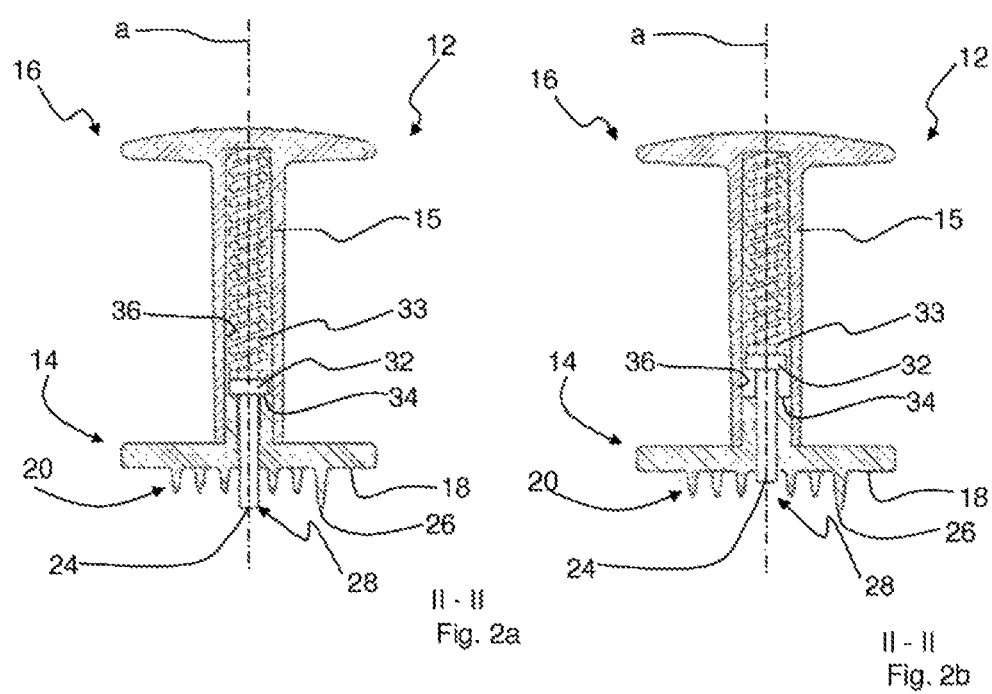
Fig. 1
Fig. 2a
Fig. 2b

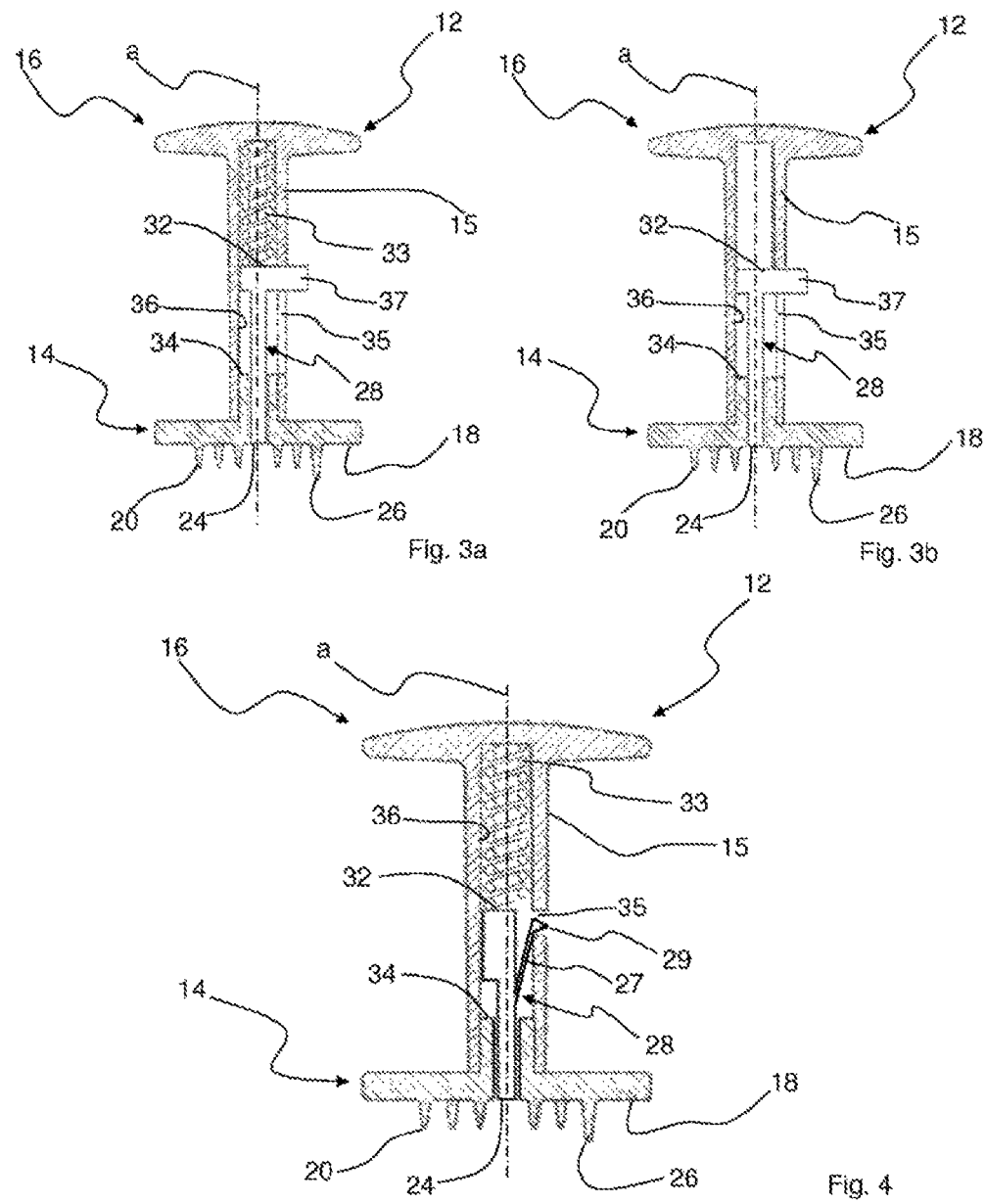

VI - VI

PIERCING DEVICE FOR A SINGLE-DOSE CAPSULE FOR POWDERED COFFEE AND THE LIKE

RELATED APPLICATIONS

This application is a 35 U.S.C. 371 national stage filing from International Application No. PCT/IB2012/053659 filed Jul. 18, 2012 and claims priority to Italian Application No. TV2011A000105 filed Jul. 21, 2011, the teachings of which are incorporated herein by reference.

FIELD OF THE INVENTION

The present invention relates to a device for piercing a single-dose capsule for a powder substance and the like.

BACKGROUND

Many types of single-dose capsules containing a product in powder or granular form, or a finely shredded product, suitable for the preparation of beverages, are known from the prior art. In the description below reference will be made specifically to a capsule containing coffee powder, it being understood, however, that the present invention is likewise applicable also to products such as herbal teas, infusions, etc.

A capsule of this type is described for example in Italian patent IT 0001342663, in the name of the same applicant. Said patent describes a capsule with a substantially cylindrical outer structure made of polymer material where the top base and the bottom base are lined with a film suitable for being sealed on the top edge and bottom edge of the outer structure, respectively. Generally, the film consists of an aluminum foil or the like suitable for alimentary use.

The use of capsules results in numerous advantages, including the possibility of keeping a product packaged in a controlled atmosphere until the moment it is used. Moreover, by using capsules it is possible to stock a huge variety of products, without the risk of rapid deterioration of the open and unconsumed product.

For the same reasons, capsules are widely used not only in a domestic environment, but also in bars, both in specifically designed coffee machines and in professional coffee machines which were originally designed for producing coffee using loose powder.

With regard to professional coffee machines, the international patent application WO 2011/010338, in the name of the same applicant, describes an adaptor to be applied to a professional coffee machine so that a capsule (for example the capsule mentioned further above) may be used instead of a loose product. In one of the embodiments of the adaptor, a first device suitable for being positioned inside a removable filter-holder, designed to contain a capsule, and a second device which can be gripped, suitable for piercing the upper film of the capsule, are described.

Even though this device is widely used, it is not, however, without certain drawbacks.

A first drawback arises during piercing of the upper film of the capsule positioned inside the filter-holder. In some cases it has been noted that the capsule remains attached to the device for piercing the upper film, resulting in extraction of the capsule from the filter-holder.

A second drawback arises during the dispensing of products which have widely varying characteristics. For example, it has been noted that, in order to produce better coffee, numerous holes must be provided in the upper film, while for the production of other infusions, it is advisable to have few holes preferably arranged on the periphery of the upper film of the capsule, in order to enhance the properties of the shredded product contained inside the capsule.

A further drawback consists in the fact that, during piercing of a capsule inserted inside a filter-holder, the user with one hand grips the handle of the filter-holder, while with the other hand he/she acts on the capsule with the piercing device. It can therefore be easily understood that the direction in which the user uses his/her two hands is not the same, resulting in problems of stability during the piercing operation. In some cases, therefore, imprecise or irregular piercing of the capsule may occur.

BRIEF SUMMARY OF EMBODIMENTS OF THE INVENTION

The object of the present invention is therefore to overcome, at least partly, the drawbacks of the prior art.

A first aim of the present invention is to provide a device for piercing the upper film of a capsule which is suitable for preventing a capsule from remaining attached to the device for piercing the upper film, at the end of the film piercing operation.

A second aim of the present invention is to provide a device for piercing the upper film of a capsule which is able to obtain at least two types of piercing impression on the upper film of a capsule.

A further aim of the present invention is to provide a kit for piercing a capsule, which is able to ensure a stable position so that the piercing impression is precise and regular.

The abovementioned object and aims are achieved by a piercing device according to Claim 1 and by piercing kit according to Claim 12.

BRIEF DESCRIPTIONS OF DRAWINGS

The characteristic features and further advantages of the invention will emerge from the description provided hereinbelow, of a number of examples of embodiment, provided by way of a non-limiting example, with reference to the accompanying drawings in which:

FIG. 1 shows a bottom plan view of a device for piercing the upper film of a capsule, according to the present invention;

FIG. 2*a* shows a cross-sectional view along the plane II-II of FIG. 1, with the piercing device in a first configuration;

FIG. 2*b* shows a cross-sectional view along the plane II-II of FIG. 1, with the piercing device in a second configuration;

FIG. 3*a* shows a cross-sectional view, similar to that of FIG. 2, of an alternative embodiment of a piercing device according to the present invention;

FIG. 3*b* shows a cross-sectional view, similar to that of FIG. 3, of an alternative embodiment of a piercing device according to the present invention;

FIG. 4 shows a cross-sectional view, similar to that of FIG. 2, of an alternative embodiment of a piercing device according to the present invention;

DETAILED DESCRIPTION OF EMBODIMENTS OF THE INVENTION

Figure 5:
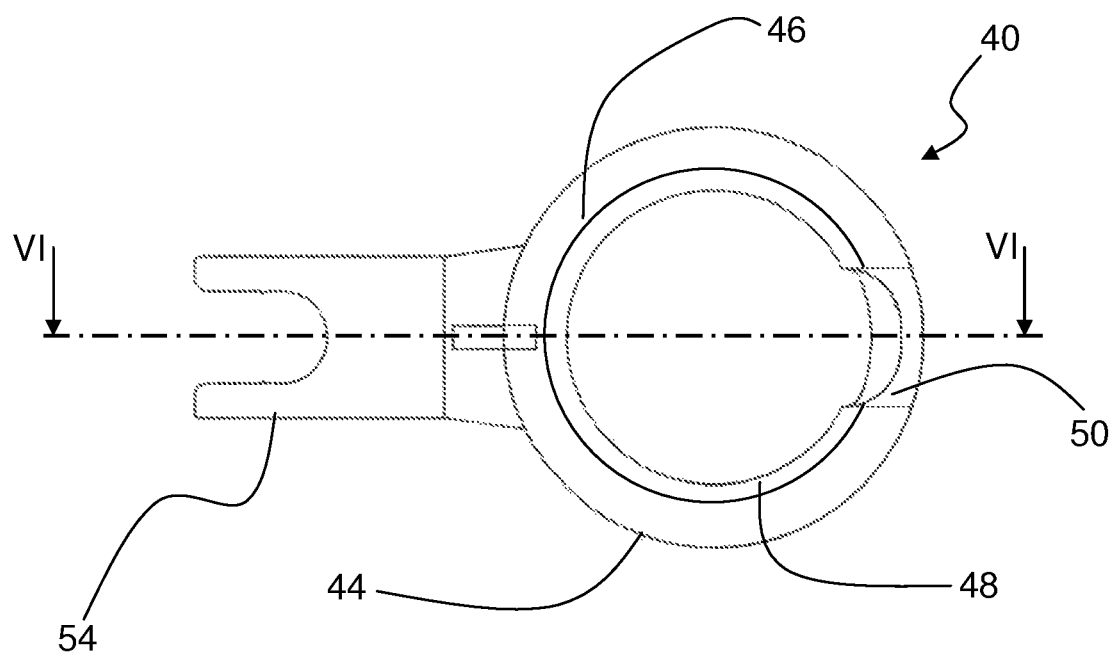
FIG. 5 shows a top plan view of a capsule-holder support device according to the present invention.

FIGS. 1, 2a and 2b show a piercing device 12 suitable for piercing the upper film 31 of a capsule 30 containing a material suitable for being used for preparation of a beverage.

The piercing device 12 according to the present invention comprises: e:
- a first end 14;
- a central body 15; and
- a second end 16 suitable for being grasped.

The first end 14 of the piercing device 12 has an operating surface 18 from which a plurality of piercing spikes 20, 26 protrudes.

With particular reference to FIG. 2a, the following are defined:
- a longitudinal direction, parallel to the piercing direction and joining the first end 14 to the second end 16; and
- a radial direction, perpendicular to the longitudinal direction.

The piercing device 12 is characterized in that it comprises disengagement means 28 on the operating surface 18, suitable for disengaging the capsule 30 once the upper film of the capsule 30 has been pierced.

In accordance with a possible embodiment of the present invention the disengagement means 28 comprise a pin 24 protruding from the operating surface 18, sliding inside an axial duct 36 formed in the operating surface 18 and having an axial extension. The pin 24 is slidable in the longitudinal direction between two different positions:
- a first forward position, where it protrudes from the operating surface 18; and
- a second retracted position, where the pin returns at least partially inside the duct 36.

FIGS. 2a and 2b show two possible operating conditions of the device according to the present invention. In particular, FIG. 2a shows the first position, while FIG. 2b shows the second position.

In accordance with a possible embodiment of the present invention, the pin 24, at its end inserted inside the axial duct 36, comprises a head 32 (visible in FIGS. 2a, 2b, 3a, 3b and 4) at least partially protruding in a radial direction and suitable for cooperating with a corresponding shoulder 34 provided inside the axial duct 36. In a manner known per se, the shoulder 34 defines the first position, acting as a stop for the pin 24 which, owing to the interaction between head 32 and shoulder 34, cannot be extracted from the operating surface 18.

The embodiment shown in FIGS. 2a and 2b will now be described in detail. FIG. 2a shows the rest condition of the device 12, corresponding in this specific case to the pin 24 in the first position, protruding by a height greater than the heights of the piercing spikes 20, 26. The pin 24 is kept in position by elastic means 33, consisting for example of a compressed spring acting between the bottom of the axial duct 36 and the head 32. Therefore, in accordance with the present embodiment, the elastic means 33 are suitable for moving the pin 24 from the second position to the first position. FIG. 2b shows the same device with the pin 24 retracted, corresponding to the second position defined above. The operating principle of the device is therefore clear to the person skilled in the art:

- the device is brought into the vicinity of the upper film 31 of the capsule 30 so that the pin 24 is in contact with the film 31;
- a pressure is exerted in order to overcome the resistance of the elastic means 33;
- the piercing spikes 20, 26 pierce the upper film 31 of the capsule 30;
- the device 12 is moved away from the capsule which, owing to the action of the pin 24 and the elastic means 33, is disengaged from the piercing spikes 20, 26.

It is also clear to the person skilled in the art how, in accordance with an embodiment similar to that described above, the pin 24 in a first position could project by a height less than the height of the piercing spikes 20, 26.

The embodiment of the piercing device 12 according to the present invention shown in FIG. 3a will now be described in detail. FIG. 3a shows the rest condition of the device 12 corresponding in this specific case to the pin 24 in the second position, not projecting from the operating surface 18. The pin 24 is kept in position by elastic means 33, consisting for example of a spring acting between the bottom of the axial duct 36 and the head 32. The elastic means 33 are suitable for moving the pin 24 from the first position into the second position. The central body 15 is provided with an extended side slot 35 from which a portion 37 of the head 32 of the pin 24 protrudes. The portion 37 is therefore movable by a user inside the side slot 35 in the longitudinal direction. It is therefore clear to the person skilled in the art that the user may move the pin 24, by means of the portion 37, from the second position to the first position. Therefore operation of the device comprises the following steps:

- the device is brought into the vicinity of the upper film 31 of the capsule 30;
- a pressure is exerted;
- the piercing spikes 20, 26 pierce the upper film 31 of the capsule 30;
- the user displaces the portion 37 so as to push the pin 24 towards the first position; then, owing to the action of the pin 24, the capsule is disengaged from the piercing spikes 20, 26;
- the pin 24 returns into the second position owing to the action of the elastic means 33.

In accordance with a possible embodiment, shown in FIG. 3b, the elastic means 33 may be absent and the pin therefore must be brought into position by means of the action of the user.

With reference to the embodiment of the present invention shown in FIG. 4, the central body 15 of the piercing device 12 is provided with a side slot 35. The pin 24 is provided with a lug 27 which is elastically deformable in the radial direction and has at one end a button 29 which in the rest condition protrudes partially from the side slot 35. The button 29 can be pushed towards the inside of the axial duct 36, substantially in the radial direction, so as to be disengaged from the edge of the side slot 35. Since the elastic means 33 are suitable for moving the pin 24 from the second position to the first position, the pin 24 moves from the second position to the first position. The operating principle of the device is therefore clear to the person skilled in the art:

- the device is brought into the vicinity of the upper film 31 of the capsule 30;
- a pressure is exerted;
- the piercing spikes 20, 26 pierce the upper film 31 of the capsule 30;

the user presses the button 29 in the radial direction inside the axial duct 36, disengaging it from the edge of the side slot 35;

the pin 24 moves from the second position to the first position, disengaging the upper film of the capsule from the piercing spikes 20, 26;

the user presses the head of the pin 24 towards the inside of the axial duct 36 until the button 29, by means of the elastic lug 27, returns into position inside the side slot 35.

Alternatively, the device according to the invention could also be used in the following manner:

the device is brought into the vicinity of the upper film 31 of the capsule 30;

a pressure is exerted;

the piercing spikes 20, 26 pierce the upper film 31 of the capsule 30;

the pin 24 is pushed towards the inside of the axial duct 36 until the button 29, by means of the elastic lug 27, returns into position inside the side slot 35;

the user presses the button 29 in the radial direction inside the axial duct 36, disengaging it from the edge of the side slot 35;

the pin 24 moves from the second position to the first position, disengaging the upper film of the capsule from the piercing spikes 20, 26.

According to a possible embodiment of the present invention, the plurality of piercing spikes 20, 26 are conical spikes. They may comprise first first piercing spikes 26 and second piercing spikes 20, where the first piercing spikes 26 have a greater height than the second piercing spikes 20 with respect to the operating surface 18.

In accordance with a possible embodiment of the piercing device 12 according to the present invention the first piercing spikes 26 are three in number. They may be arranged in the vicinity of the peripheral edge of the operating surface 18, for example along a circumference having its centre on the main axis a of the piercing device 12. Advantageously the piercing spikes 26 are spaced at 120° from one another. It is therefore clear to the person skilled in the art that, by exerting a first piercing pressure value, it is possible to pierce the upper film 31 of a capsule 30 only in three points corresponding to the first spikes 26. By increasing the intensity of the pressure exerted by the piercing device 12 on the film 31 of the capsule 30, it is possible to pierce the capsule also with the second spikes 20.

In a manner known per se, in the case of the embodiment of the piercing device 12 shown in FIGS. 2*a* and 2*b*, temporary locking devices may be provided (not shown), these being suitable for stopping the punch 24 in an intermediate position between the first position and the second position. Advantageously, in the intermediate position, only the first piercing spikes 26 may pierce the upper film 31 of the capsule 30.

The advantages of the piercing device according to the present invention are therefore clear.

A first advantage of the present invention is that of providing a device 12 for piercing the upper film 31 of a capsule 30 which is suitable for preventing the capsule from remaining attached to the piercing device 12, at the end of piercing of the film 31.

A second advantage of the present invention is that of providing a device 12 for piercing the upper film of a capsule 30 with which it is possible to obtain at least two types of piercing impression on the upper film 31 of a capsule 30. It is therefore possible to pierce the upper film 31 of a capsule 30 with the first spikes 26 in the case of capsules suitable for preparing a beverage such as barley coffee or ginseng coffee, since percolation requires greater pressure inside the capsule. In the case, instead, of espresso coffee the pressure must be slightly less and therefore the upper film 31 of the capsule 30 is perforated in several points by the first spikes 26 and the second spikes 20.

Figure 6:
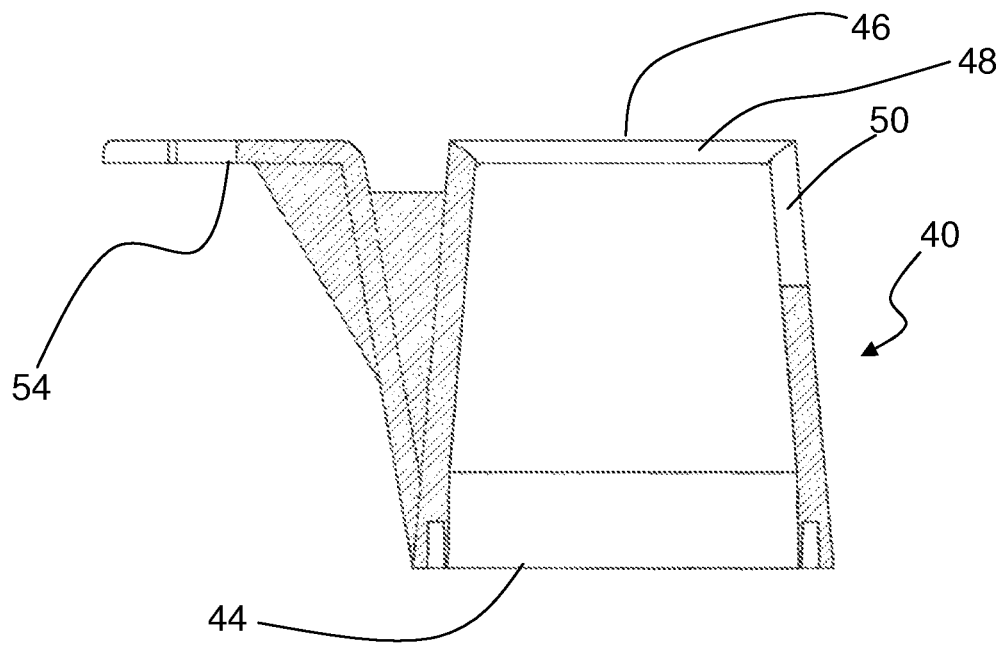
FIG. 6 shows a cross-sectional view, along the plane VI-VI of FIG. 5, of the capsule-holder support device according to the present invention.
Figure 7:
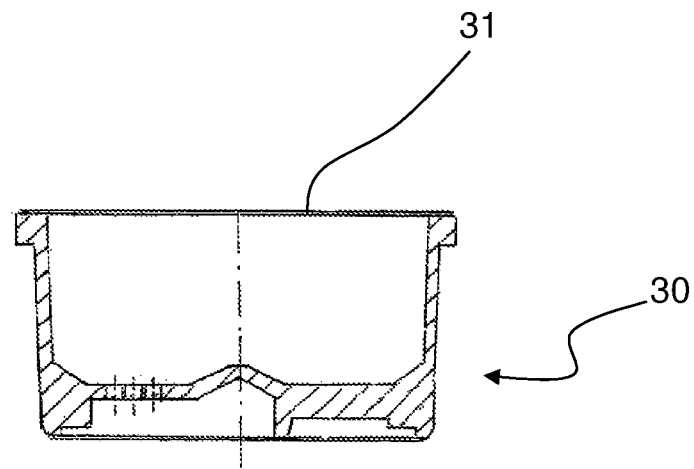
FIG. 7 shows a longitudinally sectioned view of a capsule suitable for being pierced with a piercing device according to the present invention.
Figure 8:
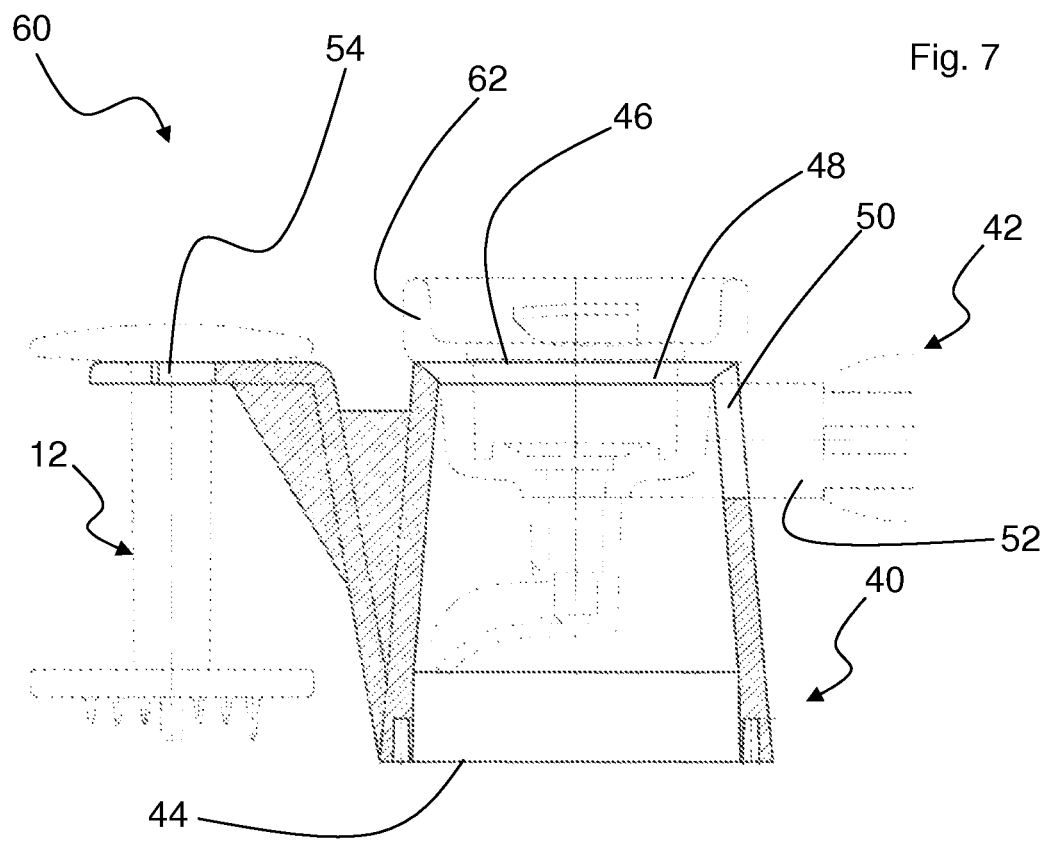
FIG. 8 shows a laterally sectioned view of the kit according to the present invention in a possible operating condition.

FIGS. 5, 6 and 8 show a kit 60 for piercing the upper film 31 of a capsule 30 according to the present invention, comprising a piercing device 12 and a support element 40 suitable for supporting a filter-holder 42 of an espresso coffee machine.

In accordance with a possible embodiment of the present invention, the kit 60 comprises a hollow frustoconical support element 40, with a larger base 44 suitable for resting on a flat surface, and a smaller base 46 suitable for engagement with the filter-holder 42. The filter-holder 42, known per se, comprises a receiving container 62 to which a handle 52 is connected.

Advantageously, the smaller base 46 comprises an edge 48 provided with a recess 50 suitable for engagement with the handle 52 of the filter-holder 42. A lug 54, suitable for supporting the piercing device 12 when it is not used, may also be provided.

The advantages compared to the prior art are therefore clear: in fact with the kit 60 for piercing the upper film 31 of a capsule 30, it is possible to obtain a stable position during the piercing operation, so that the piercing impression is precise and regular.

The person skilled in the art may, in order to satisfy specific requirements, modify and/or replace the parts described with equivalent parts, without thereby departing from the scope of the accompanying claims.

For example, embodiments may be envisaged where the piercing device 12 is mounted slidably, in the longitudinal direction, on the support element 40.

In accordance with an alternative embodiment, the piercing device 12 could have its second end 16 which can be fixed to a professional coffee machine or to a dosing/grinding device, in a manner similar to that of a coffee powder presser.

The invention claimed is:

1. Piercing device, suitable for piercing an upper film of a capsule containing a material suitable for being used for preparation of a beverage, comprising:

a first end, a central body and a second end, the first end being opposite to the second end, the central body being positioned between the first end and the second end;

said first end having an operating surface provided with a plurality of piercing spikes, each of the plurality of piercing spikes being stationary and positioned away from an outer periphery of the operating surface;

said piercing spikes being arranged along concentric circumferences having different radius and same center on the main axis of the piercing device;

said second end being suitable for being grasped by a user;

disengagement means being at least partially within the central body and slidable relative to said operating surface, said disengagement means being suitable for disengaging the capsule once the upper film of the capsule has been pierced by the plurality of piercing spikes;

wherein the operating surface defines a flat surface from which said piercing spikes project and are stationary;

wherein said piercing spikes comprise first piercing spikes and second piercing spikes, the first piercing spikes having a length greater than a length of the second piercing spikes such that the first piercing spikes protrude from the flat surface to a greater extent than the second piercing spikes; and wherein the first piercing spikes are arranged in a vicinity of a peripheral edge of the operating surface whereby in the event that a greater pressure is desired inside the capsule for use of the capsule only the first piercing spikes of the plurality of piercing spikes can be selectively chosen to pierce the upper film of the capsule.

2. The piercing device according to claim 1, wherein said disengagement means comprise:

a pin sliding inside an axial duct between:
  a first forward position, where said pin is slidable relative to the operating surface; and
  a second retracted position, where said pin returns at least partially inside the axial duct.

3. The piercing device according to claim 2, wherein said pin, at an end inserted inside the axial duct, comprises a head at least partially protruding in a radial direction from said pin and suitable for cooperating with a corresponding shoulder provided inside the axial duct, said shoulder defining said first forward position.

4. The piercing device according to claim 2, further comprising elastic means suitable for moving the pin from the second retracted position to the first forward position.

5. The piercing device according to claim 2, further comprising elastic means suitable for moving the pin from the first forward position to the second retracted position.

6. The piercing device according to claim 3, wherein said central body is provided with an extended side slot from which a portion of said head of said pin protrudes, said portion being movable along a longitudinal direction by a user.

7. The piercing device according to claim 2, wherein said central body is provided with a side slot;
  said pin being provided with an elastically deformable lug, having an end partly protruding from said side slot of said central body, said end being suitable for being pushed inside the axial duct and disengaged from an edge of said side slot.

8. The piercing device according to claim 1, wherein said first piercing spikes are three in number.

9. The piercing device according to claim 8, wherein the first piercing spikes are arranged at 120° from one another.

10. Piercing kit for a capsule for powder material or like, comprising a piercing device according to claim 1, and a support element suitable for supporting a filter-holder of an espresso coffee machine.

11. The piercing kit according to claim 10, wherein the support element has a hollow frustoconical shape, with a first base suitable for resting on a flat surface, and a second base suitable for engagement with the filter-holder, the first base larger than the second base.

12. The piercing kit according to claim 11, wherein said second base comprises an edge provided with a recess suitable for engagement with a handle of the filter-holder.

13. The piercing kit according to claim 10, wherein said support element comprises a lug, suitable for supporting the piercing device.

14. The piercing device according to claim 1, wherein said disengagement means contacts only a top portion of the capsule when disengaging the capsule.

15. The piercing device according to claim 14, wherein said disengagement means contacts only a central portion of the upper film of the capsule when disengaging the capsule.

16. The piercing device according to claim 1, wherein said disengagement means is centrally situated amongst the plurality of piercing spikes projecting from said operating surface.

17. The piercing device according to claim 1, wherein said piercing spikes are spaced apart from the disengagement means on said operating surface.

* * * * *